Dec. 6, 1960   J. N. SCOTT, JR   2,962,768
METHOD OF PRODUCING SOLID VOID-FREE
ARTICLES OF THERMOPLASTIC RESINS
Filed July 15, 1957
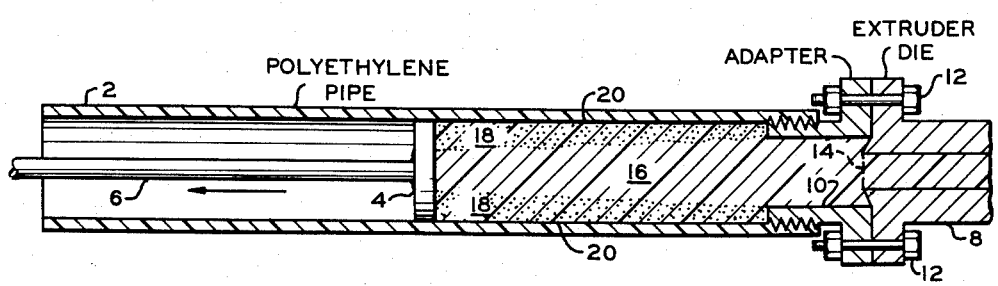
INVENTOR.
J.N. SCOTT, JR
BY
*Hudson and Young*
ATTORNEYS

[Patent document]

United States Patent Office 2,962,768
Patented Dec. 6, 1960

2,962,768
METHOD OF PRODUCING SOLID VOID-FREE ARTICLES OF THERMOPLASTIC RESINS

John N. Scott, Jr., Bartlesville, Okla., assignor to Phillips Petroleum Company, a corporation of Delaware Filed July 15, 1957, Ser. No. 671,700

15 Claims. (Cl. 18—59)

This invention relates to the manufacture of thermoplastic articles. In one aspect the invention relates to an improved method for providing void-free articles of thermoplastic resins in a plurality of shapes and forms.

Thermoplastic resins find numerous uses in the fabrication of articles having various shapes and forms. Usually it is desirable that the material employed in the fabrication processes be free from voids or pockets, both from the standpoint of appearance and to insure uniform strength and wearability.

It is an object of this invention to produce solid void-free articles of thermoplastic materials.

Another object of this invention is to produce void-free thermoplastic articles having a core of a different material from the outer surface of said articles.

Still another object of this invention is to provide an improved process for preparing solid void-free articles of thermoplastic resins.

Yet another object of this invention is to provide an improved process for producing solid void-free articles of olefin polymers in a wide variety of shapes and forms.

The foregoing objects are achieved broadly by introducing molten thermoplastic resin under pressure into one end of an elongated solid plastic enclosure opened at the other end, said enclosure being cooled from the outside to provide gradual solidification of said resin and provide a solid void-free resin product.

In one aspect of the invention, the enlongated plastic enclosure is disposed at an angle of from 0 to 90 degrees, measured from the vertical.

This invention is applicable in general to the molding of thermoplastic solid resins which contract on cooling and thus tend to form voids or pockets when molded in any substantial thickness. The invention is particularly applicable in the molding of resins having highly viscous flow characteristics when melted. Illustrative of the materials which can be treated in the method of this invention are olefin polymers such as for example homopolymers or copolymers of monoolefins like ethylene, propylene, butylene, etc., also copolymers of monoolefins and diolefins such as butadiene, isoprene, etc. Other resins which can be molded include acrylic resins such as polyalkyl acrylates, for example polymethyl acrylate, polymethyl methacrylate, polyethyl acrylate, polyethyl ethacrylate, etc.; low-flow styrene polymers, either modified or unmodified, such as butadiene-acrylonitrile-styrene terpolymer, acrylonitrile-styrene copolymer, etc., cellulose acetate, and other resins possessing similar contraction and flow characteristics.

The invention is particularly applicable to the treatment of solid olefin polymers having a density 0.94 or greater at normal atmospheric temperatures, a softening temperature of about 250 to 270° F. and a crystallinity of at least 70 percent at normal atmospheric temperatures, as determined by the method of Matthews, Peiser and Richards, Acta. Cryst., 2, 85 (1949). The following procedure is followed in preparing the sample to be tested, to assure a close approach to equilibrium before the crystallinity is determined: (1) the polymer is heated to a temperature about 90° F. above the crystalline melting point; (2) this temperature is maintained for approximately one hour; and (3) the polymer is then cooled to room temperature at a rate characterized by a fall of 2.7° F. per minute at 255° F. The preceding treatment is carried out in an enviroment essentially free of oxygen.

The following discussion is directed specifically to the treatment of solid olefin polymers, however this is not intended in any limiting sense and it is within the scope of the invention to hold any of the polymers previously mentioned.

Solid olefin polymers can be prepared by contacting the olefin to be polymerized with a catalyst at an elevated temperature and pressure, preferably in the presence of the solvent or diluent material. The temperature required for polymerization varies over a wide range; however, usually it is preferred to carry out the reaction at a temperature between about 150° F. and 450° F. The particular temperature to be employed in each individual case depends on the catalyst used, the olefins to be polymerized and the operating conditions employed such as pressure, space velocity, diluent to olefin ratio, etc.

The polymerization pressure is often maintained at a sufficient level to assure a liquid phase reaction, that is at least about 100 to 300 p.s.i.g., depending upon the type of feed material and the polymerization temperature. Higher pressure up to 500 to 700 p.s.i.g. or higher can be used, if desired. When utilizing a fixed catalyst bed the space velocity varies from as low as 0.1 to about 20 volumes of feed per volume of catalyst per hour, with the preferred range being between about 1 and about 6 volumes per volume. The polymerization process can also be carried out in the presence of a mobile catalyst. In this type of operation the catalyst concentration in the reaction zone is usually maintained between about 0.01 and about 10 percent by weight and the feed residence time can be from 10 minutes or less to 10 hours or more.

A preferred polymerization method is described in detail in a copending application of Hogan and Banks, Serial No. 573,877, filed March 26, 1956. This particular method utilizes a chromium oxide catalyst containing hexavalent chromium, with silica, alumina, silica-alumina, zirconia, thoria, etc. In one embodiment of this application, olefins are polymerized in the presence of a hydrocarbon diluent, for example an acyclic, alicyclic or aromatic compound which is inert and in which the formed polymer is soluble. The reaction is ordinarily carried out at a temperature between about 150° F. and about 450° F. and usually under a pressure sufficient to maintain the reactant and diluent in the liquid state. The polymers produced by this method, particularly the polymers of ethylene, are characterized by having an unsaturation which is principally either transinternal or terminal vinyl, depending on the particular process conditions employed. When low reaction temperatures, about 150° F. to about 320° F., and a mobile catalyst are used for polymerization, the product polymer is predominantly terminal vinyl in structure. When polymerization is carried out at higher temperatures and in a fixed catalyst bed, the polymer has predominantly transinternal unsaturation. Polymers prepared by both methods are also characterized by their high densities and high percentage of crystallinity at normal atmospheric temperatures.

Other less advantageous and nonequivalent procedures which employ different catalysts are also used for preparing olefin polymers. For example, polymers are prepared in the presence of organometallic compounds such as triethyl aluminum plus titanium tetrachloride, mixtures of ethylaluminum halides with titanium tetrachloride, and the like. Another group of catalysts which is used comprises a halide of a Group IV metal such as, for example, titanium tetrachloride, silicon tetrabromide, zirconium tetrachloride, tin tetrabromide, etc. with one or more free metals selected from the group consisting of sodium, potassium, lithium, rubidium, zinc, cadmium and aluminum.

The solvent or diluent employed in the polymerization reaction includes in general, paraffins which dissolve the polymers at the temperature employed in the reaction zone. Among the more useful solvents are paraffins having between about 3 and 12 carbon atoms per molecule, such as, for example, propane, isobutane, n-pentane, isopentane, isooctane, etc., and preferably those paraffins having 5 to 12 carbon atoms per molecule. Also useful in the polymerization reaction are alicyclic hydrocarbons, such as cyclohexane, methylcyclohexane, etc. Aromatic diluents are also used, however in some instances they (or impurities therein) tend to shorten the catalyst life, therefore, their use will depend on the importance of catalyst life. All of the foregoing and in addition other hydrocarbon diluents which are relatively inert and in the liquid state at the reaction conditions may also be employed in carrying out the reaction of olefins to form solid polymers.

In carrying out the invention in its broad aspect, the molten highly viscous thermoplastic resin is introduced into a plastic enclosure, such as a plastic pipe, in such a manner that the molten resin fills the cross-section of the enclosure near the point of introduction. During the filling operation, the plastic enclosure is cooled externally so that the resin adjacent to the inner surface of said enclosure is reduced in temperature, solidifies and adheres or fuses to said inner surface. As more resin is introduced to the enclosure, the thickness of the solidified material gradually increases adjacent to the point of introduction and eventually throughout the enclosure. When the resin material reaches the opposite end of the enclosure or fills a sufficient portion of the enclosure to provide the length of solid article desired, solidification of the resin across the entire cross-section of the other end is provided whereby further advancement of the flow of molten resin halted. Solidification of the resin at the desired point, to supply the necessary resistance to flow, can be provided in several ways. For example, the flow of molten polymer can be halted by mechanical means, such as by a piston, or the like until solidification of the cross section of the resin adjacent to the piston takes place, after which the piston can be removed. Also solidification of the resin at the desired point can be accomplished by suitably controlling the rate at which heat is removed from the enclosure, for example, by accelerating the cooling rate at the localized area where complete resin solidification is desired. Even with a uniform cooling rate, depending on the cross section of the enclosure and the rate of introduction of the resin, the length of enclosure which can be filled before cross sectional solidification of resin occurs is limited, and eventually solidification of the molten resin across the enclosure cross section will automatically take place. This will occur whether the enclosure is filled while in the vertical or horizontal position, or while inclined at an angle between the vertical and horizontal. Solid articles of almost any length can be made however by appropriately controlling the filling and cooling rates and the most flexible operation is, of course, provided by supplying a mechanical resistance to flow during the latter part of the filling operation.

As stated, gradual solidification of resin takes place within the enclosure during the entire filling process. Since the resin volume decreases substantially on solidification, it is necessary to keep introducing fresh molten resin even after the enclosure is completely filled. Thus there is maintained throughout the entire filling operation a molten core of resin along the length of the enclosure. By maintaining the enclosure open at the end opposite the filling end gas or air which is present in the enclosure during the filling operation is allowed to escape. Complete resistance to flow at the other end of the enclosure does not occur until the desired portion of the enclosure is completely filled with resin, and is thus gas or air-free.

After the enclosure is sealed to further flow of molten resin therethrough the resin core begins to solidify in the opposite direction, that is from the point of sealing toward the point of introduction of the resin. Since the molten resin continues to contract while cooling, introduction of additional resin to the molten core is continued during this portion of the operation. Eventually, the cooling process removes sufficient heat whereby all of the resin within the enclosure becomes solidified, at which point it is no longer possible to introduce additional resin. The resulting product is a solid void-free article.

Preferably, the molten resin is introduced to the plastic enclosure through an extruder which should be centered on the enclosure feed opening. A high pressure is necessary to force the molten resin through the enclosure and particularly through the molten core after a substantial amount of resin solidification has taken place. The amount of pressure required increases during the filling operation and is dependent upon a number of factors, including the particular resin being extruded, the rate of flow of the resin, the size of the plastic enclosure, etc. Usually it is desirable to provide a filling pressure of between about 20 to 20,000 p.s.i.g.; and preferably above about 500 p.s.i.g. during the latter part of the filling operation.

In view of the elevated pressure required, it is desirable that the enclosure have a wall thickness such that the molten material used to fill it will fuse with the inner surface and yet not cause distortion of the enclosure. For example, if a plastic pipe is used as the enclosure, it is desirable that the material have a wall thickness of between about 0.1 and 0.5 inch depending on the diameter of the pipe. Thus, pipes of small diameter can have a smaller wall thickness than those of large diameter. The enclosure can be of the same or different material from the core material and can include any of the thermoplastic resins previously described. For many purposes, of course, it is desirable that the enclosure and the core material be of the same material.

The temperature of the core material during extrusion depends to a certain extent upon the size and shape of the article being produced. For example, when a plastic pipe is being filled with a high density, highly crystalline ethylene polymer, extrusion temperatures in the range of between about 300° and about 600° F. are applicable. Some variations in temperature are required when utilizing different types of thermoplastic materials. In any event, the temperature must be maintained at a suitable level to keep the core material in a molten and highly viscous state until it is deposited on the inner surface of the enclosure and forms a bond therewith. It may be desirable, depending on the particular resin and enclosure material, to maintain an inert gas atmosphere, such as carbon dioxide, nitrogen or the like, within the enclosure during extrusion to prevent oxidation of the molten resin. Whether or not such a gas is employed depends on the particular resin employed, the enclosure material and also on the extrusion temperature.

During filling, the enclosure can be positioned in any convenient manner such as, for example, in the vertical position or in a horizontal position or inclined at an angle. In order to assure uniform solidification of resin progressively around the inner periphery of the enclosure, it is necessary in the first stage of the process to provide for filling of the entire cross-section of the enclosure adjacent to the point of introduction of the molten resin. If the enclosure is filled in the vertical and upwardly, the enclosure itself provides the resistance necessary to force molten resin across the entire cross-section of the said enclosure. If the enclosure is filled while in a horizontal position or while inclined at an angle to the vertical, the necessary resistance to flow can be supplied mechanically, such as, by a piston similar to that previously mentioned, or the like.

Once a cross section of the enclosure is sealed with molten resin solidification occurs at the outer edges of the molten mass, with fusing and adherence of the solidified resin with the inner wall of the enclosure, thus leaving a molten core of resin. As more of the molten resin flows through the center core and is forced along the inner surface of the enclosure, solidification continues uniformly about the inner periphery of the enclosure and gradually becomes thicker in the direction of flow. Eventually, as previously stated, the molten resin fills and reaches the open end of the enclosure, through which any gases contained therein are vented, and at this point the open end is closed momentarily until the core of resin adjacent thereto becomes solidified. Thereafter, as more resin is forced into the enclosure to fill contractions provided by solidification of the resin, the core becomes smaller and smaller and eventually solidifies.

If a piston is employed to provide resistance to flow in the initial stage of the filling process the piston can be withdrawn from the enclosure after initial solidification of the resin takes place or if desired the piston can be allowed to remain in the enclosure, being pushed by the advancing molten resin until the enclosure is filled, and then utilized again to supply the required resistance to flow at the other end of the enclosure.

It is an important aspect of the invention in that once solidification and fusing of resin to the inner surface of the enclosure occurs, even though the enclosure is in or approaches the horizontal, the flowing molten resin distributes itself substantially evenly around the inner periphery of the enclosure rather than filling just the bottom portion of the enclosure.

Both the rate of cooling of the core material and the rate of filling of the enclosure are important. Cooling, preferably, is done slowly in order that the solidification will be as uniform as possible. Usually cooling by merely exposing the enclosure to room temperature is satisfactory; however, if the enclosure is sufficiently large in cross-section, it is necessary to resort to additional cooling means, such as, by indirect heat exchange with a cooling fluid.

The rate of filling, that is, the feed rate of the molten resin, is directly related to the cooling rate and in addition is dependent on the particular resin being employed, and on the shape and cross-section of the plastic enclosure. Thus, for example, when feeding a molten ethylene polymer into a circular pipe, with atmospheric cooling, it is desirable that the feed rate of the molten polymer be maintained between about 0.25 and about 5 pounds per hour.

The use of a thermoplastic resin mold, which forms a part of the solid void-free product, in place of a conventional glass or metal mold provides several advantages. In the first place, it provides the obvious advantage of eliminating expensive molding equipment and also the problems encountered in removing the molded product from the mold. In addition, it eliminates the need for heating the mold to prevent too rapid cooling of the thermoplastic resin. It is necessary in order to provide the void-free product of this invention that the molten resin be cooled at a low rate. This is easily accomplished when using a thermoplastic mold or enclosure due to the insulating properties of the thermoplastic material. Thus, as previously pointed out, usually cooling by exposing the enclosure to room temperature is adequate. On the other hand, both glass and metals are relatively poor insulators, and if molds of these materials are used external heating is required to maintain the necessary low resin cooling rate.

In order to more clearly describe the invention and provide a better understanding thereof, reference is had to the accompanying drawing which is a diagrammatic illustration in cross-section of suitable equipment for carrying out the invention. Referring to the drawing, there is provided a polyethylene pipe 2 sealed at one end with a movable piston 4 driven by shaft 6 and sealed at the other end by a screwed adapter 10 which is bolted to an extruder die 8 by bolts 12. In the operation of this apparatus molten thermoplastic material, for example polyethylene, is provided from an extruder (not shown), passing from extruder die 8 through the die opening 14 into adapter 10 and from there into polyethylene pipe 2. During this operation pipe 2 is cooled externally, for example by exposure to the atmosphere, so that the polyethylene adjacent to the inner surface of the pipe is reduced in temperature, solidifies and fuses to the inner surface 20 of said pipe. As additional polymer is introduced to the pipe the thickness of the solidified material 18 gradually increases adjacent to the point of introduction and eventually throughout the pipe. Thus as the filling process is continued there is provided a band of solidified material of increased thickness in the direction of flow, surrounding a molten core 16 of polymer. As additional polymer is forced into the pipe the piston 4 moves away from the extruder die. When the piston reaches the opposite end of the pipe its movement is halted until solidification of the polymer across the cross-section of the pipe occurs at the piston face. The piston can then be removed from the pipe if desired. Introduction of molten polyethylene to fill up the space provided by shrinkage of the polymer during solidification continues until the pipe is completely filled with solidified polymer. At this point it is no longer possible to introduce additional polymer and a product is obtained which is completely solid and void free.

The following data is presented as an illustration of one embodiment of the invention.

*Example*

Ethylene was polymerized in a continuous process in the presence of a cyclohexane diluent and finely subdivided chromium oxide catalyst comprising 2.5 percent chromium oxide, containing 2.2 percent hexavalent chromium, supported on silica alumina (90/10). The catalyst was prepared by impregnating silica alumina with chromium trioxide solution followed by drying and activation in air up to 950° F. for several hours. Six runs were made using the following operating conditions.

| | A [1] | B |
|---|---|---|
| Temperature, ° F | 302 | 297 |
| Pressure, p.s.i.g | 420 | 420 |
| Catalyst conc. in reactor, wt. percent | 0.07 | 0.05 |
| Polymer conc. in reactor, wt. percent | 8 | 9.5 |
| Chromium as chromium oxide in catalyst, wt. percent | 2.5 | 2.5 |
| Cyclohexane feed rate, lbs./hr | 200 | 200 |
| Ethylene feed rate, lbs./hr | 30 | 33 |
| Residence time, hours | 1.72 | |

[1] Five runs made.

Products from the several runs were blended and physical properties of the blend were determined. The following values represent the average of three determinations:

Melt index [1] _____ 76
Density, gm./cc. at room temp. _____ 0.961
Melting point, °F. [2] _____ 252
Stiffness, p.s.i. [3] _____ 153,000
Heat distortion, °F. [4] _____ 171
Impact strength, Izod ft. lbs./in. notch [5] _____ 3.42
Compression molded [6]—
    Tensile, p.s.i. _____ 4,540
    Elongation, percent _____ 20
Injection molded [7]—
    Tensile, p.s.i. _____ 4,623
    Elongation, percent _____ 33

[1] ASTM D1238–52T.
[2] Carried out by melting a sample of the polymer, inserting a thermocouple into the molten polymer and allowing the molten polymer to cool slowly. The temperature is recorded and is plotted on a chart versus time. The crystalline freeze point (melting point) is the first plateau in the time v. temp. curve.
[3] ASTM D747–50.
[4] ASTM D648–45T.
[5] ASTM D256–54T.
[6] ASTM D412–51T.
[7] ASTM D638–52T.

The above described polyethylene was employed, in the molten state, to fill a polyethylene pipe which had been previously prepared from a similar sample of polyethylene. The pipe had an inside diameter of 2.0 inches and an outside diameter of 2.38 inches. The molten polymer was extruded into the pipe at a temperature of 500° F. using a one-inch National Rubber Machinery Company extruder equipped with a wedge shaped die ½" x 1/16". A Teflon adapter connected the extruder to the polyethylene pipe. The molten plastic was extruded upward slowly at a rate of about one pound per hour until the pipe was filled. The extruder die was centered with respect to the pipe and as the molten material deposited on the walls, it solidified and the wall thickness was built up gradually. Exposure to the air provided sufficient cooling to solidify the molten polymer after it was extruded. The rod thus produced was smooth and round, and had a good appearance. X-ray examination revealed that the rod was free from voids.

The articles of this invention find general application in services where void-free thermoplastic articles are employed. The method of this invention has particular utility in that the cross section of the articles thereby produced are not limited; thus void free rods of large diameter not heretofore producible by conventional methods, can easily be made.

I claim:

1. A method for producing a solid void-free article of thermoplastic material which comprises introducing molten thermoplastic resin under pressure to one end of an elongated solid thermoplastic enclosure open at the other end, providing a resistance to flow within and adjacent to the feed end of said enclosure whereby the molten resin fills the cross section of said enclosure, cooling said enclosure, maintaining the resistance to flow at least until solidification and fusing of a portion of the molten resin with the inner surface of said enclosure occurs whereby there is provided a molten core of resin in the filled portion of said enclosure surrounded by solidified resin, continuing filling and cooling of said enclosure until said enclosure is completely filled with resin, providing solidification of resin across the entire cross section of said enclosure at the other end and continuing cooling until all of the resin within the enclosure is solidified whereby a solid void-free product is obtained which contains a core of thermoplastic material integral with said enclosure.

2. The proces of claim 1 in which solidification of resin across the entire cross section at the other end is provided by temporarily sealing the enclosure.

3. The process of claim 1 in which solidification of resin across the entire cross section at the other end is provided by increasing the rate of cooling at the other end.

4. The process of claim 1 in which the enclosure is inclined at an angle between 0 and 90 degrees, measured from the vertical.

5. A method for producing a solid void-free article of olefin polymer which comprises introducing molten olefin polymer to one end of an elongated solid olefin polymer enclosure opened at the other end, providing a resistance to flow within and adjacent to the feed end of said enclosure whereby the molten polymer fills the cross section of said enclosure, cooling said enclosure, maintaining the resistance to flow at least until solidification and fusing of a portion of the molten polymer with the interior surface of said enclosure occurs whereby there is provided a molten core of polymer in the filled portion of said enclosure surrounded by solidified polymer, continuously filling and cooling said enclosure until said enclosure is completely filled with polymer, providing solidification of the polymer across the entire cross section of said enclosure at the other end and continuing cooling of the enclosure until the polymer contained therein is completely solidified whereby a solid void-free product is obtained which contains a core of olefin polymer integral with said enclosure.

6. The process of claim 5 in which the molten polymer is ethylene polymer.

7. The process of claim 6 in which the enclosure is formed of ethylene polymer.

8. The process of claim 7 in which the molten olefin polymer is maintained at a temperature between about 300 and about 600° F. and an atmosphere of inert gas is maintained within the enclosure during the filling operation.

9. The process of claim 8 in which solidification of resin across the entire cross section at the other end is provided by temporarily sealing the enclosure.

10. The process of claim 8 in which solidification of resin across the entire cross section at the other end is provided by increasing the rate of cooling at the other end.

11. The process of claim 8 in which the enclosure is inclined during filling at an engle between 0 and 90 degrees measured from the vertical.

12. A method for producing a solid void-free rod of ethylene polymer which comprises introducing molten ethylene polymer into one end of a solid ethylene polymer pipe opened at the other end, providing a resistance to flow within and adjacent to the feed end of said pipe whereby the molten polymer fills the cross-section of said pipe, cooling said pipe, maintaining the resistance to flow at least until solidification and fusing of a portion of the molten polymer with the interior surface of said pipe occurs whereby there is provided a molten core of polymer in the filled portion of said pipe surrounded by solidified polymer, continuously filling and cooling said pipe until said pipe is completely filled with polymer providing solidification of the polymer across the entire cross-section of said pipe at the other end and continuing cooling of the pipe until the polymer contained therein is completely solidified whereby a solid void-free rod is obtained which contains a core of ethylene polymer integral with said pipe.

13. The process of claim 12 wherein the pipe is cooled by exposing it to room temperature.

14. The process of claim 13 in which the pipe is filled in the vertical position.

15. The process of claim 13 in which the pipe is filled in the horizontal position.

References Cited in the file of this patent

UNITED STATES PATENTS

| | | |
|---|---|---|
| 1,994,164 | Bailey | Mar. 12, 1935 |
| 2,371,709 | Rineer | Mar. 20, 1945 |
| 2,689,376 | Wacker | Sept. 21, 1954 |
| 2,697,854 | Boasson | Dec. 28, 1954 |
| 2,716,778 | Beare | Sept. 6, 1955 |
| 2,719,330 | Stott | Oct. 4, 1955 |

FOREIGN PATENTS

| | | |
|---|---|---|
| 528,469 | Canada | July 31, 1956 |